United States Patent
Huang et al.

(10) Patent No.: US 7,408,590 B2
(45) Date of Patent: Aug. 5, 2008

(54) COMBINED SCALING, FILTERING, AND SCAN CONVERSION

(75) Inventors: Qifan Huang, Sunnyvale, CA (US); Yu T. Tian, Palo Alto, CA (US)

(73) Assignee: Micronas USA, Inc., Santa Clara, CA (US)

( * ) Notice: Subject to any disclaimer, the term of this patent is extended or adjusted under 35 U.S.C. 154(b) by 323 days.

(21) Appl. No.: 11/120,842

(22) Filed: May 2, 2005

(65) Prior Publication Data

US 2005/0251544 A1 Nov. 10, 2005

Related U.S. Application Data

(63) Continuation-in-part of application No. 10/966,058, filed on Oct. 14, 2004, now Pat. No. 7,259,796.

(60) Provisional application No. 60/568,892, filed on May 7, 2004, provisional application No. 60/635,114, filed on Dec. 10, 2004.

(51) Int. Cl.
H04N 1/393 (2006.01)
H04N 7/01 (2006.01)

(52) U.S. Cl. .............. 348/581; 348/441; 348/704; 348/561; 348/625; 348/627; 382/298; 345/472; 345/660

(58) Field of Classification Search .......... 348/581, 348/704, 445, 441, 578, 561; 382/298, 299, 382/300, 260; 345/472, 472.1, 472.2, 660; 358/451; 715/815; 702/197, 190
See application file for complete search history.

(56) References Cited

U.S. PATENT DOCUMENTS

| 5,384,912 | A | 1/1995 | Ogrinc et al. |
| 5,422,827 | A * | 6/1995 | Niehaus ............... 702/190 |
| 5,587,742 | A * | 12/1996 | Hau et al. ............. 348/441 |
| 5,809,182 | A * | 9/1998 | Ward et al. ............ 382/298 |
| 6,075,906 | A | 6/2000 | Fenwick et al. |
| 6,108,047 | A * | 8/2000 | Chen .................... 348/581 |
| 6,177,922 | B1 | 1/2001 | Schiefer et al. |
| 6,281,873 | B1 | 8/2001 | Oakley |
| 6,347,154 | B1 | 2/2002 | Karanovic et al. |
| 6,563,544 | B1 * | 5/2003 | Vasquez ............... 348/447 |
| 6,618,445 | B1 | 9/2003 | Peng et al. |
| 6,661,427 | B1 * | 12/2003 | MacInnis et al. ....... 345/660 |
| 6,690,427 | B2 * | 2/2004 | Swan .................... 348/448 |
| 6,724,948 | B1 * | 4/2004 | Lippincott ............. 382/298 |
| 6,937,291 | B1 * | 8/2005 | Gryskiewicz .......... 348/581 |
| 7,058,237 | B2 * | 6/2006 | Liu et al. ............... 382/276 |
| 7,184,609 | B2 * | 2/2007 | Liu et al. ............... 382/276 |

(Continued)

OTHER PUBLICATIONS

"AVC/MPEG High-Definition Decoder", Broadcom Corporation [online] [Retrieved on Sep. 7, 2005]. Retrieved from the Internet: <URL: http://www.broadcom.com/products/Cable/HDTV-SDTV-Video,-Graphics-%26-Receiver-Chips/BCM7411>, 2 pages.

(Continued)

Primary Examiner—David Ometz
Assistant Examiner—Jean W Désir
(74) Attorney, Agent, or Firm—Mayer Brown LLP

(57) ABSTRACT

Techniques for performing combined scaling, filtering, and/or scan conversion are disclosed that reduce that amount of line buffer space required in the overall design of a video processing system. In particular, coefficients from all or a sub-set of the scaling, filtering (smoothing/sharpening), and scan conversion filters are combined into one representative coefficient that can be applied in a single generic algorithm. Thus, implementation costs are reduced, particularly in system-on-chip implementations.

9 Claims, 5 Drawing Sheets

U.S. PATENT DOCUMENTS

| | | | |
|---|---|---|---|
| 2001/0046260 | A1 | 11/2001 | Molloy |
| 2003/0007562 | A1 | 1/2003 | Kerofsky et al. |
| 2003/0012276 | A1 | 1/2003 | Zhong et al. |
| 2003/0080981 | A1* | 5/2003 | Lin et al. ............... 345/660 |
| 2003/0095711 | A1 | 5/2003 | McGuinness et al. |
| 2003/0138045 | A1 | 7/2003 | Murdock et al. |
| 2003/0156650 | A1 | 8/2003 | Campisano et al. |
| 2003/0198399 | A1 | 10/2003 | Atkins |
| 2004/0085233 | A1 | 5/2004 | Linzer et al. |
| 2004/0240559 | A1 | 12/2004 | Prakasam et al. |
| 2004/0260739 | A1 | 12/2004 | Schumann |
| 2004/0263361 | A1 | 12/2004 | Pearson et al. |
| 2005/0001745 | A1 | 1/2005 | Sankaran |
| 2007/0025723 | A1* | 2/2007 | Baudisch et al. ............ 396/287 |

OTHER PUBLICATIONS

"BCM7411 Product Brief", Broadcom Corporation [online] [Retrieved on Dec. 8, 2005] Retrieved from the Internet: <URL: http://www.broadcom.com/collateral/pb/7411-PB05-R.pdf>. 2 pages.

Broadcom Announces High Definition TV Decoder Reference Design Platform.

Featuring H.264 Advanced Video Compression, Broadcom Corporation [online] [Retrieved on Sep. 7, 2005]. Retrieved from the Internet: <URL: http://www.broadcom.com/press/release.php?id=660337. 4 pages.

Burger, Douglas et al., "Memory Systems", The Computer Science and Engineering Handbook, Ed. Allen B. Tucker, 1997, pp. 447-461, CRC Press, Boca Raton, FL.

"Differential Motion Vectors" [online] [Retrieved on Oct. 14, 2002] Retrieved from the Internet: <URL: http://www.cmlab.csie.ntu.edu.tw/cml/dsp/training/coding/h263/motion.html>. 2 pages.

"Dual Channel AVC HD Reference Platform", Broadcom Corporation [online] [Retrieved on Dec. 14, 2005] Retrieved from the Internet: <URL: http://www.broadcom.com/collateral/pb/97395-PB00-R.pdf>. 2 pages.

"Dual High-Definition Digital Video System-on-Chip Solution for Cable, Satellite, and DTV", Broadcom Corporation [online] [Retrieved on Dec. 14, 2005]. Retrieved from the Internet: <URL: http://www.broadcom.com/collateral/pb/7038-PB01-R.pdf>. 2 pages.

"EM8400", Sigma Designs [online] Jan. 9, 2003 [Retrieved on Dec. 8, 2005] Retrieved from the Internet: <URL: http://www.sigmadesigns.com/pdf_docs/em8400brochure.pdf>. 2 pages.

"EM8470", Sigma Designs [online] Mar. 20, 2003 [Retrieved on Dec. 8, 2005] Retrieved from the Internet: <URL: http://www.sigmadesigns.com/pdf_docs/em847xbrochure.pdf>. 2 pages.

"EM8485", Sigma Designs [online] Apr. 30, 2003 [Retrieved on Sep. 7, 2005] Retrieved from the Internet: <URL: http://www.sigmadesigns.com/pdf_docs/EM8485brochure.pdf>. 2 pages.

"EM8500", Sigma Designs [online] Jan. 16, 2004 [Retrieved on Dec. 8, 2005] Retrieved from the Internet: <URL: http://www.sigmadesigns.com/pdf_docs/em8500_brochure.pdf>. 2 pages.

"EM8610", Sigma Designs [online] Jan. 13, 2004 [Retrieved on Dec. 8, 2005] Retrieved from the Internet: <URL: http://www.sigmadesigns.com/pdf_docs/em8610_brochure.pdf>. 2 pages.

"EM8610L", Sigma Designs [online] Aug. 2005 [Retrieved on Dec. 8, 2005] Retrieved from the Internet: <URL: http://www.sigmadesigns.com/pdf_docs/EM8610LSeries_br.pdf>. 2 pages.

"H.264 Advanced Video Coding: A Whirlwind Tour", PixelTools [online] [Retrieved on Sep. 7, 2005] Retrieved from the Internet: <URL: http://www.pixeltools.com/h264_paper. html>. 8 pages.

"H.264/MPEG-4 Part 10 Advanced Video Coding", Moonlight Technology [online] [Retrieved on Sep. 7, 2005] Retrieved from the Internet: <URL: http://www.moonlight.co.il/technology/h264/>. 2 pages.

"H.264 Video Decoder for HDTV", Sci-Worx [online] [Retrieved on Sep. 7, 2005] Retrieved from the Internet: <URL: http://www.sci-worx.com/uploads/media/H264VD.pdf>. 2 pages.

"ITU-T H.264—Series H: Audiovisual and Multimedia Systems Infrastructure of Audiovisual Services—Coding of Moving Video", International Telecommunication Union, Mar. 2005, pp. xiii-330.

"MPEG-4 AVC/H.264 Video Decoder", Conexant Systems, Inc. [online] [Retrieved on Dec. 8, 2005] Retrieved from the Internet: <URL: http://www.conexant.com/servlets/DownloadServlet/102551A.pdf?Fileld=1870>. 2 pages.

Schafer, Ralf et al., "The Emerging H.264/AVC Standard", EBU Technical Review, Jan. 2003, 12 pages.

Tourapis, Alexis M. et al., "Motion Vector Prediction With Reference Frame Consideration", 8 pages.

"Video DSP", TechnoWorld, Sony Corporation [online] [Retrieved on Dec. 8, 2005] Retrieved from the Internet: <URL: http://www.sony.net/Products/SC-HP/cx_news/vol13/pdf/tw_dsp.pdf>. 4 pages.

Wiegand, Thomas, "Context-Based Adaptive Coding and the Emerging H.26L Video Compression Standard", 27 pages, Heinrich Hertz Institute, Berlin, Germany.

Editor, Techweb Network TechEncyclopedia, http://www.techweb.com/encyclopedia/, web encyclopedia article on "chroma subsampling", Oct. 22, 2007, The Computer Language Company.

* cited by examiner

COMBINED SCALING, FILTERING, AND SCAN CONVERSION

RELATED APPLICATIONS

This application claims the benefit of U.S. Provisional Application No. 60/635,114, filed on Dec. 10, 2004. In addition, this application is a continuation-in-part of U.S. application Ser. No. 10/966,058, filed Oct. 14, 2004, and titled "System and Method for Rapidly Scaling and Filtering Video Data", now U.S. Pat. No. 7,259,796, which claims the benefit of U.S. Provisional Application No. 60/568,892, filed on May 7, 2004. In addition, this application is related to U.S. application Ser. No. 11/120,443, filed May 2, 2005, titled "Method and System for Scaling, Filtering, Scan Conversion, Panoramic Scaling, YC Adjustment, and Color Conversion in a Display Controller" now published as US Patent Application Publication 2005/0248590. Each of these applications is herein incorporated in its entirety by reference.

FIELD OF THE INVENTION

The invention relates to video processing, and more particularly, to a video architecture and techniques for combined scaling, filtering, and scan conversion.

BACKGROUND OF THE INVENTION

Scaling, filtering, and scan conversion are common video post-processing functions in a decoder.

Scaling involves making an image or video frame larger or smaller than its original resolution. For example, a video frame may be scaled up to fit a large screen, scaled down to fit a small screen, or scaled to occupy only a portion of the screen (i.e., thumbnail display). During down scaling, the size of a frame is reduced by removing pixels. On the other hand, up scaling involves increasing the size of a frame by creating new pixels for interpolating between and/or replacing original pixels in the frame. Converting a video from NTSC (640×480) resolution to HDTV (1920×1080) resolution is an example of up scaling. An example of down scaling would be converting from HDTV to NTSC.

When a frame is scaled, the value of each new pixel in the scaled frame is based on the values of one or more pixels in the original frame. The calculation of each new pixel can be formulated as a linear equation in which the value of each original pixel used to calculate the new pixel is multiplied by a coefficient that determines the relative weight of the original pixel in the calculation. The value of a new pixel is typically calculated based its on neighboring original pixels, with different coefficients being used for different types of scaling. A frame may be scaled vertically and/or horizontally. In either case, the ratio of the number of output pixels to the number of input pixels is referred to as the scaling ratio. For a scaling ratio of m:n, there are m pixels in the scaled frame for every n input pixels from the original frame. For example, an up scaling of 33% can be represented by a ratio of 4:3.

Filtering involves modifying the pixels in a frame based on the desired characteristics of the output frame. For example, certain filters are used to generate a smoothed or blurred version of the original frame, while other filters might sharpen or enhance the edges that appear in the image. Contrast and brightness can also be adjusted using filtering operations. Filters can also be used to effect changes in color saturation. Filtering is similar to scaling in that the value of each filtered pixel is calculated based on a linear equation in which the values of one or more input pixels are multiplied by coefficients.

Scan conversion involves the conversion of the input video data stream from one format to another, such as from progressive scan format to interlaced scan format, or vice-versa.

Conventional solutions for performing scaling, filtering, and scan conversion typically involve the use of a large line buffer (SRAM), especially for high definition (HD) video applications. Such large line buffers are costly, as they increase chip size and power consumption. This is particularly problematic for a video processing system-on-chip (SOC) design, where small chip size and low power dissipation are highly desirable features.

In some conventional configurations, each of the scaling, filtering, and scan conversion functions are carried out in a corresponding pipeline stage. In such configurations, each stage requires its own line buffer (SRAM). Again, the use of such line buffers collectively occupies a significant amount of space and power consumption, and ultimately increases the cost of the chip or chip set. Also, using separate operations may adversely impact the operational speed.

What is needed, therefore, are techniques for performing scaling, filtering, and/or scan conversion that reduce the amount of line buffer space required in the overall design.

SUMMARY OF THE INVENTION

One embodiment of the present invention provides a method for carrying out combined scaling, filtering (smoothing/sharpening), and scan conversion to prepare a video signal for display. The method includes receiving pixel data to be displayed, and determining if scan conversion is enabled for the received pixel data. In response to scan conversion not being enabled, the method includes loading a coefficient for combined vertical up scaling and filtering, and applying a combined vertical up scaling and filtering algorithm. On the other hand, in response to scan conversion being enabled, the method includes loading a coefficient for combined vertical up scaling, filtering, and scan conversion, and applying a combined vertical up scaling, filtering, and scan conversion algorithm.

The method may further include one or more of the following: applying a horizontal down scaling algorithm, applying 1:2 vertical down pre-scaling algorithm, loading a coefficient for combined horizontal up scaling and filtering, and applying a combined horizontal up scaling and filtering algorithm, and storing at least portions of the pixel data in a line buffer to facilitate combined scaling and filtering processing. The coefficients can be loaded, for example, from a pre-calculated coefficient table stored in a memory (e.g., RAM and/or ROM).

In one particular configuration, at least one of the algorithms is configured with an n-tap scaling filter and m-tap smoothing/sharpening filter, and the corresponding coefficient is a vector of size (m+n−1). In one such case, the vector includes (m+n−1) filter strengths, with each filter strength having a coefficient for one or more corresponding filter taps. A filter strength can be selected, for example, based on a desired degree of smoothing or sharpening, and whether or not scan conversion is enabled.

Another embodiment of the present invention provides a method for carrying out combined scaling, filtering (smoothing/sharpening), and scan conversion to prepare a video signal for display. This particular embodiment includes receiving pixel data to be displayed, and applying a combined vertical up scaling and filtering algorithm that uses a coefficient configured for combined vertical up scaling and filtering. Here, the algorithm and the coefficient can be further configured to carryout scan conversion in addition to vertical up scaling and filtering. The method may further include storing at least portions of the pixel data in a line buffer to facilitate combined scaling and filtering processing (so that neighboring pixels are available).

Prior to applying the combined vertical up scaling and filtering algorithm, the method may further include applying a horizontal down scaling algorithm. After applying the combined vertical up scaling and filtering algorithm, the method ay include applying a combined horizontal up scaling and filtering algorithm that uses a coefficient configured for combined horizontal up scaling and filtering. In one particular case, the scaling is associated with a scaling ratio, and the method further includes applying a 1:2 vertical down pre-scaling algorithm if the scale ratio is greater than an established threshold.

Another embodiment of the present invention provides a device for carrying out combined scaling, filtering (smoothing/sharpening), and scan conversion to prepare a video signal for display. The device includes a line buffer for storing at least portions of received pixel data to facilitate combined scaling and filtering processing. A vertical scaling and filtering module is also provided for applying a combined vertical up scaling and filtering algorithm that uses a coefficient configured for combined vertical up scaling and filtering.

The algorithm and the coefficient can be further configured to carryout scan conversion in addition to vertical up scaling and filtering. The device may include one or more horizontal down scaling modules for applying a horizontal down scaling algorithm. The device may include a horizontal up scaling module for applying a combined horizontal up scaling and filtering algorithm that uses a coefficient configured for combined horizontal up scaling and filtering. In one particular case, the scaling is associated with a scaling ratio, and the device further includes a 1:2 vertical down pre-scaling module for applying 1:2 vertical down pre-scaling algorithm if the scale ratio is greater than an established threshold.

The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION OF THE INVENTION

Techniques for performing combined scaling, filtering, and/or scan conversion are disclosed that reduce the amount of line buffer space required in the overall design of a video processing system. The techniques can be implemented, for example, as a display controller chip, or as a display controller circuit integrated into an overall video processing system-on-chip or chip set.

Generally, the functions of scaling, filtering (smoothing/sharpening), and scan conversion are all types of mathematical filtering. In accordance with principles of the invention, coefficients from all or a sub-set of the scaling, filtering (smoothing/sharpening), and scan conversion filters are combined into one representative coefficient that can be applied in a single application (e.g., using a single buffer in a single pipeline stage). Thus, implementation costs are reduced, particularly in a system-on-chip implementations.

System Architecture

Figure 1:
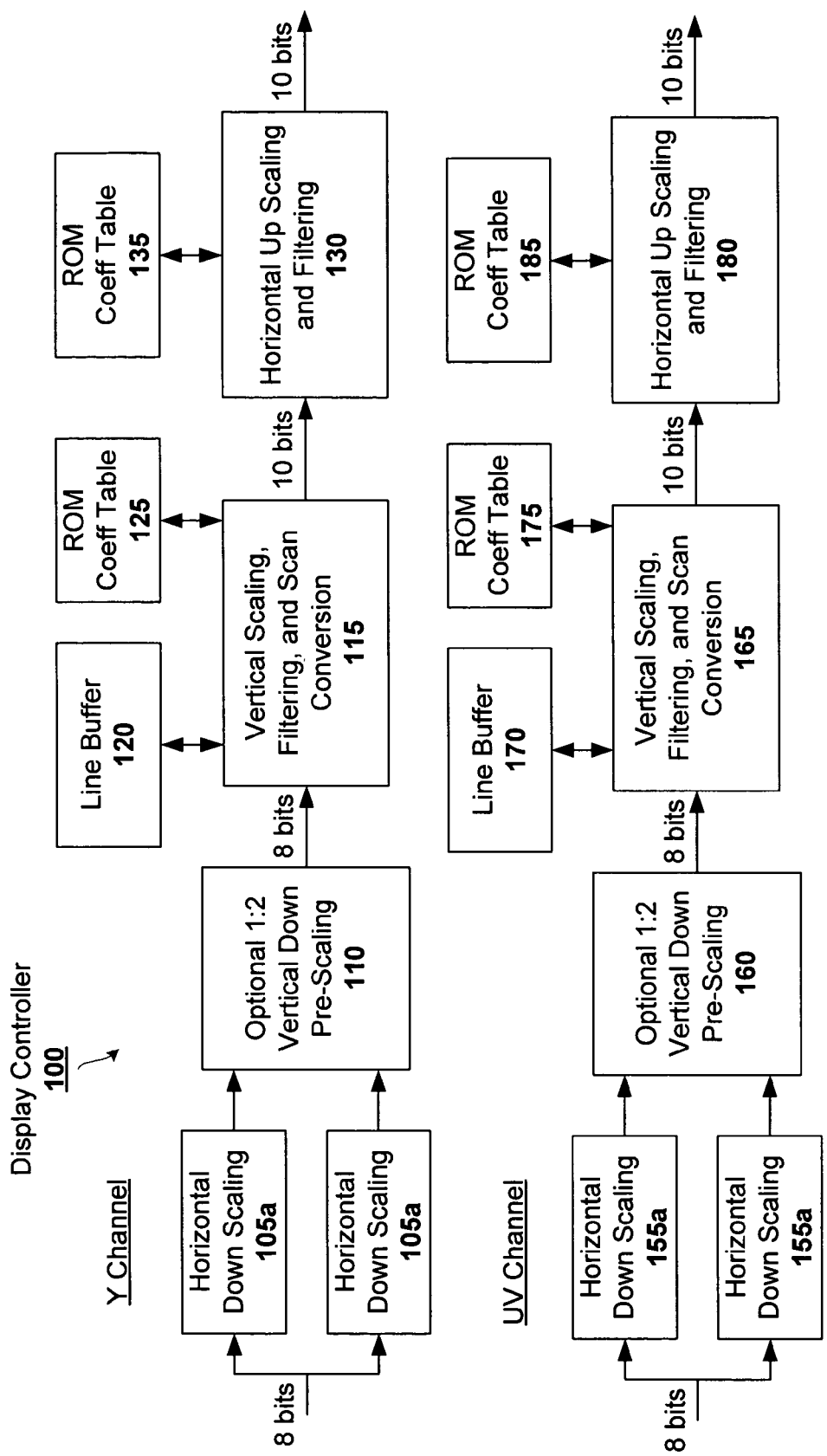
FIG. 1 is a block diagram of a display controller configured in accordance with an embodiment of the present invention.

FIG. 1 is a block diagram of a display controller 100 configured in accordance with an embodiment of the present invention. YUV signals are provided to the controller 100 by, for example, direct memory access channels (e.g., each channel is 8-bits). As can be seen, the controller 100 includes a Y channel and a UV channel. The Y channel is for processing the Y component of the input, which represents the luminance or brightness of the video data. The UV channel is for processing the U and V components, which represent the chrominance or color of the video data.

The Y channel includes a pair of horizontal down scaling modules 105a and 105b, an optional 1:2 vertical down pre-scaling module 110, a combined vertical scaling/filtering/scan conversion module 115, a line buffer 120, a ROM table 125, a combined horizontal up scaling and filtering module 130, and a ROM coefficient table 135. The UV channel is similarly constructed, and includes a pair of -horizontal down scaling modules 155a and 155b, an optional 1:2 vertical down pre-scaling module 160, a combined vertical scaling/filtering/scan conversion module 165, a line buffer 170, a ROM table 175, a combined horizontal up scaling and filtering module 180, and a ROM coefficient table 185. Such a dual channel configuration allows for parallel processing the video signal components.

Other modules or functionality not shown in the figure may also be included in the display controller 100 (or otherwise operatively coupled to the display controller 100). For instance, post-controller processing circuitry might include componentry for converting the output of the controller 100 from YUV signals back to RGB signals, panoramic scaling circuitry, and color conversion circuitry. Pre-controller processing circuitry might include coder/decoder (CODEC) circuitry, and a direct memory access (DMA) engine and its memory.

In this particular embodiment, the horizontal down scaling modules 105a and 105b receive the Y signals of the video frame data via an 8-bit bus, and the horizontal down scaling modules 155a and 155b receive the UV signals of the video frame data via an 8-bit bus. Each of the horizontal down scaling modules is configured to shrink the size of the frames in the horizontal direction. As is known, the degree of the horizontal down scaling depends on factors such as the desired image resolution and quality, and the size of the target display, and can be set accordingly.

Use of two horizontal down scaling modules (105a/105b and 155a/155b) allows for parallel processing, where each module can operate on a portion of a row of video frame data. However, other configurations will be apparent in light of this disclosure, and the present invention is not intended to be limited to any one such embodiment. The amount of data processed in each cycle can vary from one application to the next, and can be selected accordingly based on factors such as the desired processing speeds, available memory, and the size of the original video data frames.

The optional 1:2 vertical down pre-scaling modules 110 and 160 are configured to shrink the size of the frames in the vertical direction, and in particular, to one half the original vertical size. Such 1:2 vertical down pre-scaling can be implemented with conventional or custom technology, and may be desirable, for example, when the vertical scale ratio is relatively large (e.g., as compared to an established threshold vertical scale ratio).

The vertical scaling, filtering, and scan conversion modules 115 and 165 are configured to combine the functions of vertical scaling, vertical filtering, and scan conversion using a generic scaling algorithm. Respective filter coefficients that effectively combine the mathematical properties of each function (scaling, smoothing/sharpening, scan conversion) are stored in the ROM coefficient tables 125 and 175. In this particular embodiment, the vertical scaling, filtering, and scan conversion modules 115 and 165 operate to increase the resolution of the video data being processed from 8 bits to 10 bits (up scaling).

The line buffers 120 and 170 each store a number of horizontal frame lines so that the vertical processing can take place. As is known, data from neighboring pixels is sometimes used in the scaling process. Thus, the buffers 120 and 170 make this neighboring pixel data available. In one particular embodiment, the buffers 120 and 170 are each configured to hold five to ten lines of pixels up to 1920 pixels per line. Such a configuration allows for high definition applications, but other configurations can be used here as well (e.g., standard definition applications where each line of the video frames is 720 pixels).

The horizontal up scaling and filtering modules 130 and 185 are configured to combine the functions of horizontal up scaling and horizontal filtering using a generic scaling algorithm. Respective filter coefficients that effectively combine the mathematical properties of each function (scaling and smoothing/sharpening) are stored in the ROM coefficient tables 135 and 185. Note that the generic scaling algorithm implemented by the vertical scaling, filtering, and scan conversion modules 115 and 165 can be the same algorithm implemented by the horizontal up scaling and filtering modules 130 and 185.

The architecture can be implemented, for example, as a system-on-chip or chip set using field programmable gate array (FPGA) technology or application specific integrated circuitry (ASIC) or other custom built hardware. Alternatively, a combination of hardware and software can be used to implement the controller 100 using, for example, a digital signal processor (DSP) programmed to receive pixel data and to execute scaling, filtering, and scan conversion. Thus, the algorithms described herein can be carried out using hardware, software, or a combination thereof.

Additional detail on horizontal and vertical scaling (both down and up), as well as example algorithms that can be implemented by modules 105a/105b/155a/155b, 110/160, and 115/180, will now be discussed in turn with reference to FIGS. 2 through 5.

Down Scaling

Figure 2:
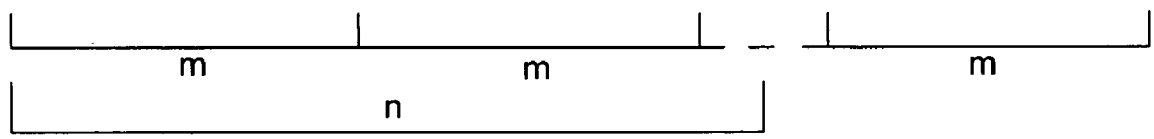
FIG. 2 illustrates a graphical representation of down scaling in accordance with an embodiment of the present invention.

FIG. 2 illustrates a mathematical representation of down scaling in accordance with an embodiment of the present invention. Here, the scaling ratio of m:n on one dimension (e.g., horizontal) is shown, with n pixels P(1), P(2), ..., P(n), up-sampling to m*n pixels. One pixel is output per n pixels by a linear down scaling algorithm.

Figure 3:
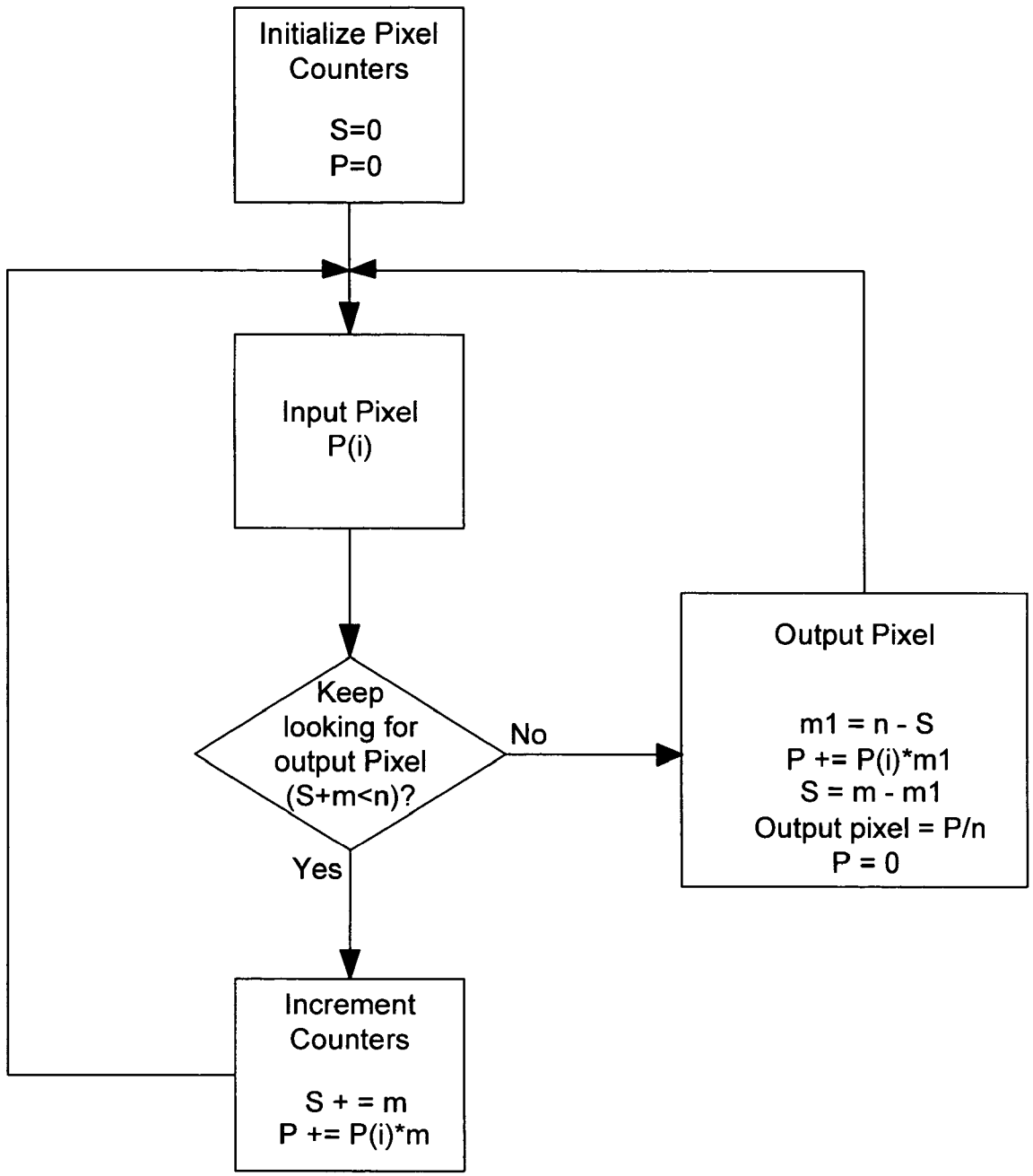
FIG. 3 illustrates an example of a down scaling algorithm configured in accordance with an embodiment of the present invention.

FIG. 3 illustrates an example of a linear down scaling algorithm configured in accordance with an embodiment of the present invention. This algorithm can be used, for example, to carry out the horizontal down scaling performed by the horizontal down scaling modules 105a/105b and 155a/155b. This is down scaling on one dimension of the image. Note that there are no coefficients associated with the down scaling process, for either horizontal or vertical.

The algorithm commences with initialization of the pixel counters (S=0 and P=0). Next, pixel data P(i) is received for down scaling. Next, a determination is made as to whether the output pixel has been found. This determination is based on the scaling ratio m:n (S+m>n). If the output pixel has not been found, then increment the pixel counters (S=S+m and P=P+Pi*m, note shorthand notation used in FIG. 3) and repeat process for the next pixel. If the output pixel has been found, then stop looking, and output the pixel (output pixel =P/n) and set variables/counters accordingly (m1=n−S, P+=P(i)*m1, S 32 m−m1, P=0). Repeat the process for the next pixel.

For down scaling on two dimensions of the image, the algorithm shown in FIG. 2 can be applied on the horizontal dimension first, and then on the vertical dimension. Thus, the vertical down scaling could be performed, for example, by the vertical scaling, filtering, and scan conversion modules 115 and 165 using the algorithm shown in FIG. 3.

Note that 1/n can be estimated. The n is typically limited, such as n<=16. In one particular embodiment, 1/n is calculated using a pre-calculated look-up table (LUT) using Equation 1:

$$1/n \approx (x) >> k \qquad \text{(Equation 1)}$$

where k is a pre-determined constant. Generally stated, the larger the value of k, the better the approximation is of 1/n. x is the approximation for 1/n, and can be gotten from the pre-calculated LUT. Such an approximation saves the hardware cost of implementing a 1/n divider circuit. Alternatively, a conventional divider circuit can be used to calculate 1/n.

In reviewing the following pseudo code for one embodiment of the down scaling algorithm, assume the following: the scaling ratio mh:nh represents down scaling on the horizontal direction, where mh<nh<=16; the scaling ratio mv:nv represents down scaling on the vertical direction, where mv<nv<=16; the input image size is hsize×vsize, where Hsize<1920 and Vsize<1080; there are no fno frames; the input pixel at (i, j) for frame f variable is represented as pixin(f,i,j); the output pixel at (i, j) for frame f is represented as pixout(f,i,j); pixel position within a horizontal buffer is represented as pixbuff(i); and the variable x/n=(x*DivN(n−1))>>8,n>=2, can be represented as a table DivN(k)={1, 128, 85, 64, 51, 43, 36, 32, 28, 26, 23, 21, 20, 18, 17, 16}.

The pseudo code for carrying out down scaling:

```
For(f=0;f<fno;f++)
{
    sv=0; pv=0;                    /initialize vertical pixel counters/
    l=0;
    clear pixbuff, let pixbuff(k)= 0, for all k   /clear pixel buffer to all zeroes/
```

```
                                            -continued

For (i =0;i<vsize;i++)                  /loop for each of the 1080 vertical columns of the frame/
{
        sh=0; ph=0;                     /initialize horizontal pixel counters/
        k =0;
        for(j=0; j<hsize;j++)           /loop for each of the 1920 horizontal columns of the frame/
        {
                if((sh+mh)<nh)          /horizontal scaling output not found yet/
                {
                        sh + = mh;      /increment pixel counters/
                        ph + = pixin(f,i,j)*mh;   /do accumulating/
                }
                else                    /horizontal scaling output found/
                {
                        mhl= nh−sh;     /calculate the weight of the last input pixel/
                        ph+=Pixin(f,i,j)*mhl;   /sum weighted last input pixel into the accumulation/
                        sh = mh−mhl;    /get the weight of the input pixel for next output pixel/
                        if(nh>1)
                                phout = (DivN(nh)*ph)>>8;   /calculate output pixels/
                        else
                                phout = ph;
                        if((sv+mv)<nv)  /vertical scaling output not found yet/
                        {
                                pixbuff(k) + = phout*mv
                        }
                        else            /vertical scaling output found/
                        {
                                mvl = nv−sv;    /weight of the last input line/
                                pvout = pixbuff(k) + phout*mvl;   /sum in the last line/
                                if(nv>1)
                                        pixout(f,l,k) = (DivN(nv)*pvout)>>8; /calculate vertical output/
                                else
                                        pixout(f,l,k) = pvout;
                                pixbuff(k) = 0;
                        }
                        k++;
                        ph = 0;
                }
        }
        sv +=mv;
        if(sv>nv)
                l++;
}
```

Up Scaling

Figure 4:
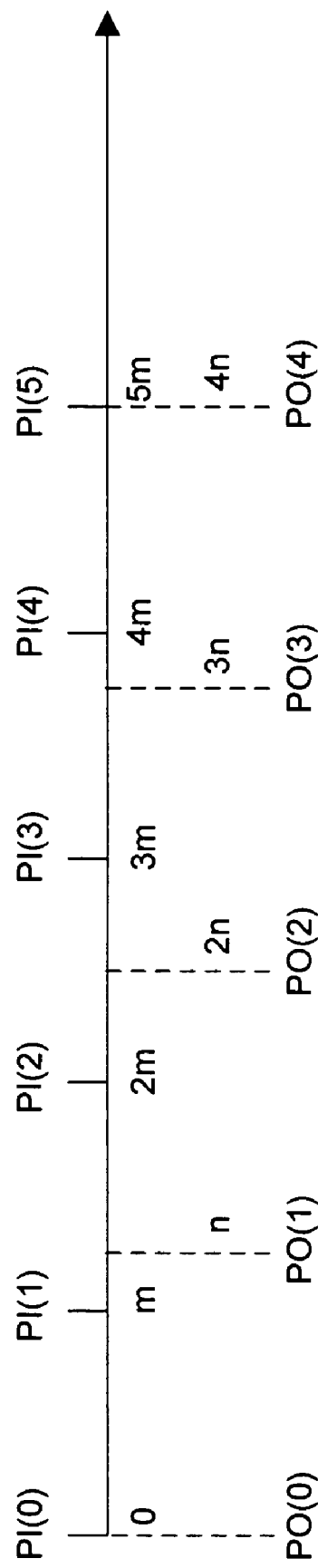
FIG. 4 illustrates a graphical representation of up scaling in accordance with an embodiment of the present invention.

FIG. 4 illustrates a graphical representation of up scaling in accordance with an embodiment of the present invention. For m:n scaling applied to N input pixels {PI(i), i=0, . . . , N−1} at positions {(ioff+i*idst)*m, i=0, . . . , N−1}, where, ioff is the offset of PI(0) and idst is the distance between two adjacent input pixels. There will be M=N*m/n output pixels (PO(j), i=0, . . . , M−1) at positions {(joff+j*jdst)*n, j=0, . . . , M−1}. Also, PO(j)=(PI(im1)*coeff[k][0]+PI(i)*coeff[k][1]+PI(ip1)*coeff[k][2]+PI(ip2)*coeff[k][3])>>10, where i=j*n/m, im1=(i)?(i−1):0, ip1=i+1, ip2=i+2, and K=j*n−[j*n/m]*m.

Coeff[k][x]x=0,1,2,3 are pre-calculated according to what kind of filter is being used, such as a combinational filter for vertical scaling, smoothing/sharpening, and scan conversion, or a combinational filter for horizontal up scaling and smoothing/sharpening.

As previously explained, the coefficients can be stored in a table, such as the ROM coefficient tables 125 and 175, and the ROM coefficient tables 135 and 185 of FIG. 1. In one particular embodiment, for m:n scaling, a table with a size of 4×10 bits×m (m<=16) is used to implement the ROM coefficient tables 125 and 175 for storing the pre-calculated coefficients associated with the combined scaling, filtering, and scan conversion (if enabled).

The ROM coefficient tables 135 and 185 may have the same dimensions, as the ROM coefficient tables 125 and 175, or may be different if dictated by the particulars of the corresponding algorithm. In one particular embodiment, the ROM coefficient table 135 is 16×17×48 bits (for the Y channel) and the ROM coefficient table 185 is 4×17×48 bits (for the UV channel).

Note that there need be no difference between the Y and UV channels in the ROM coefficient tables. Further note that other types of memory can be used here (e.g., RAM or flash memory), depending on factors such as desired non-volatility and power consumption. Numerous memory schemes can be used here.

The pseudo code for carrying out combinational up scaling, filtering, and scan conversion:

```
Let f = (((joff+j*jdst)*n)−ioff*m)/(idst*m), where f is an integer
If(f<0)          /output position is in the left outside of the picture/
{
    i =0; im1 =0; ip1 = 0;
}
else{
    i = f;                          /filter center position/
    im1 = (i) ? (i−1) : 0           /position of one pixel left of the
                                    filter center/
    ip1 = (i+1) < M−1 ? i+1 : M−1   /position of one pixel right of the
                                    filter center/
    ip2 = (i+2) < M−1 ? i+2 : M−1   /position of two pixel right of the
                                    filter center/
```

-continued

```
}
k= (j*jdst*n) % (idst*m)           /index of coefficients/
PO(j) = (PI(im1)*coeff[k][0] + PI(i)*coeff[k][1] + PI(ip1)*coeff[k][2] +
PI(ip2)*coeff[k][3] ) >>10 /calculate output by applying filter coefficients/
```

This generic algorithm can be used, for example, to carry out the combined vertical up scaling, smoothing/sharpening, and scan conversion performed by the vertical scaling, filtering, and scan conversion of modules 115 and 165. Likewise, this algorithm can be used, for example, to carry out the combined horizontal up scaling and smoothing/sharpening performed by the horizontal scaling and filtering modules 130 and 180.

Combinational Coefficients

As previously explained, the functions of scaling, filtering, and scan conversion are all types of mathematical filtering. Thus, coefficients from all or a sub-set of the scaling, filtering (smoothing/sharpening), and scan conversion filters are combined into one representative coefficient that can be applied in a single generic algorithm as previously described.

The Coeff[k][x]x=0,1,2,3 are pre-calculated according to what kind of filter is being used. In one embodiment, a combinational filter for vertical scaling, smoothing/sharpening, and scan conversion is implemented, such as modules 115 and 165 of FIG. 1. Alternatively, or in addition to, a combinational filter for horizontal up scaling and smoothing/sharpening is implemented, such as modules 130 and 180 of FIG. 1.

The derivation of how the combinational filter coefficients are developed is now discussed. Assume Fj and Sk to be the smoothing/sharpen filter and the scaling filter, respectively, where j=−m, . . . , m, and k=−n, . . . , n.

First, apply filter F to image to get Pixel Pi':

$$P'_i = \sum_{j=-m}^{m} P_{i+j} F_j \quad \text{(Equation 2)}$$

Continuing with the derivation, apply filter S to $P_i'$ to get Pixel $P_i''$:

$$P''_i = \sum_{k=-n}^{n} P'_{i+k} S_k \quad \text{(Equation 3)}$$

Now, solve Pi" in terms of Pi using Equation 2:

$$P''_i = \sum_{k=-n}^{n} \left( \sum_{j=-m}^{m} P_{i+k+j} F_j \right) S_k \quad \text{(Equation 4)}$$

Solving for Pi" provides $$P''_i = \sum_{j=-m-n}^{m+n} P_{i+j} C_j, \quad \text{(Equation 5)}$$

where $C_j$ is the combined coefficient.

By way of example, assume a 4-tap scaling filter [S-1 S0 S1 S2] and a 5-tap smoothing/sharpening filter [F-2 F-1 F0 F1 F2] are applied. Here, the combined coefficient C can be calculated as follows:

$$C = \begin{bmatrix} F_{-2} & & & \\ F_{-1} & F_{-2} & & \\ F_0 & F_{-1} & F_{-2} & \\ F_1 & F_0 & F_{-1} & F_{-2} \\ F_2 & F_1 & F_0 & F_{-1} \\ & F_2 & F_1 & F_0 \\ & & F_2 & F_1 \\ & & & F_2 \end{bmatrix} \times \begin{bmatrix} S_{-1} \\ S_0 \\ S_1 \\ S_2 \end{bmatrix} \quad \text{(Equation 5)}$$

From Equation 5, an n-tap scaling filter and m-tap smoothing/sharpening filter results in a coefficient C vector of size (m+n−1). The following different flavors of smoothing/sharpening filters can be applied:

TABLE 1

| Filter Strength | Filter Coefficients | | | | |
|---|---|---|---|---|---|
| −4 | 1 | 4 | 6 | 4 | 1 |
| −3 | | 1 | 2 | 1 | |
| −2 | | 3 | 10 | 3 | |
| −1 | −1 | 3 | 12 | 3 | −1 |
| 0 | | | 1 | | |
| 1 | −1 | 1 | 8 | 1 | −1 |
| 2 | 1 | −2 | 18 | −2 | 1 |
| 3 | | −1 | 0 | −1 | |

Here, a filter strength=0 equates to no filtering, a filter strength=−1, . . . , −4, equates to increasingly stronger smoothing, and a filter strength=1, 2, 3, equates to increasingly stronger sharpening.

If scan conversion is enabled, it is equivalent to apply a smoothing filter. Thus, when scan conversion is enabled, the filter strength is subtracted by a pre-set amount, such as 3. This will have the effect of performing both smoothing and scan conversion. For instance, assume the filter strength for a combined vertical scaling and smoothing/sharpening operation is 2. The corresponding filter coefficients are 1, −2, 18, −2, and 1, which correspond to the taps of the combinational filter algorithm that performs the scaling and smoothing/sharpening. If scan conversion is also desired (so as to provide a 3-way combinational process), then the initially selected filter strength is decremented by 3 to provide a new filter strength of −1. Here, the corresponding filter coefficients are −1, 3, 12, −3, and −1.

Note that if the initial filter strength is already on the low end and the pre-defined decrement cannot be made in full, then the decrement can be made as best as possible. For instance, assume the initially selected filter strength for a combined vertical scaling and smoothing/sharpening operation is −3. The corresponding filter coefficients are 1, 2, and 1. If scan conversion is also desired, then the initially selected filter strength is decremented to its lowest value, which in this case −4. Here, the corresponding filter coefficients are 1, 4, 6, 4, and 1. This alternate filter strength selection is made, because the actual filter strength value produced by fully decrementing by the pre-set amount of 3 is beyond the range of the vector.

Methodology

Figure 5:
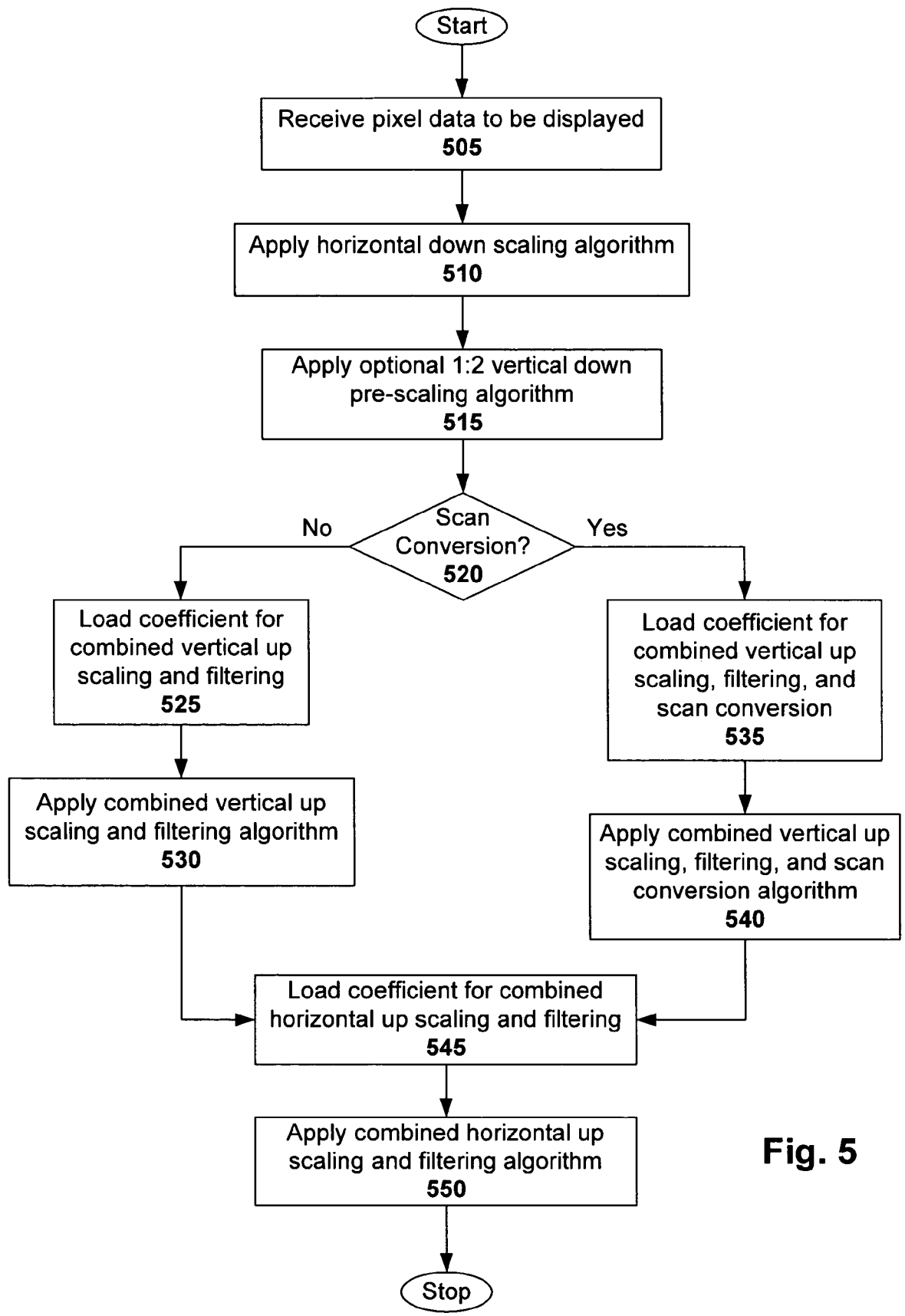
FIG. 5 illustrates a method for carrying out combined scaling, filtering (smoothing/sharpening), and scan conversion in accordance with an embodiment of the present invention.

FIG. 5 illustrates a method for carrying out combined scaling, filtering (smoothing/sharpening), and scan conversion in accordance with an embodiment of the present invention. The method can be carried out, for example, by the display controller 100 of FIG. 1.

The method begins with receiving 505 pixel data to be displayed. The pixel data may be in YUV format, or other known pixel formats. The method continues with applying 510 a horizontal down scaling algorithm (e.g., using a conventional algorithm or an algorithm as discussed in reference to FIGS. 2 and 3), and applying 515 optional 1:2 vertical down pre-scaling (e.g., using a conventional algorithm).

The method continues with determining 530 if scan conversion is enabled for the received pixel data (e.g., using a local processor, such as an FPGA, ASIC, DSP, or other suitable processing environment). If not, the method continues with loading 525 a coefficient for combined vertical up scaling and filtering, and applying 530 the combined vertical up scaling and filtering algorithm. If scan conversion is enabled, however, then the method continues with loading 535 a coefficient for combined vertical up scaling, filtering, and scan conversion, and applying 540 the combined vertical up scaling, filtering, and scan conversion algorithm. Note that the algorithm applied in either case can be the same, with the difference associated with scan conversion being enabled represented in the combined coefficient(s) used (e.g., as explained with reference to Table 1).

In either case, the method continues with loading 545 a coefficient for combined horizontal up scaling and filtering, and applying 550 a combined horizontal up scaling and filtering algorithm. Note that the loaded coefficients can be retrieved, for example, from coefficient tables 125/165 and/or 135/185. In addition, the vertical and horizontal up scaling, filtering, and scan conversion (if enabled) can be carried out, for example, by an algorithm as discussed in reference to FIG. 4.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A method for carrying out combined scaling, smoothing/sharpening filtering, and scan conversion to prepare a video signal for display, comprising:
   receiving pixel data to be displayed;
   determining if scan conversion is enabled for the received pixel data;
   in response to scan conversion not being enabled:
      loading a coefficient for combined vertical up scaling and filtering; and
      applying a combined vertical up scaling and filtering algorithm;
   in response to scan conversion being enabled:
      loading a coefficient for combined vertical up scaling, filtering, and scan conversion; and
      applying a combined vertical up scaling, filtering, and scan conversion algorithm.

2. The method of claim 1 further comprising:
   applying a horizontal down scaling algorithm.

3. The method of claim 1 further comprising:
   applying a 1:2 vertical down pre-scaling algorithm.

4. The method of claim 1 further comprising:
   loading a coefficient for combined horizontal up scaling and filtering; and
   applying a combined horizontal up scaling and filtering algorithm.

5. The method of claim 1 further comprising:
   storing at least portions of the pixel data in a line buffer to facilitate combined scaling and filtering processing.

6. The method of claim 1 wherein the coefficients are loaded from a pre-calculated coefficient table stored in a memory.

7. The method of claim 1 wherein at least one of the algorithms is configured with an n-tap scaling filter and m-tap smoothing/sharpening filter, and the corresponding coefficient is a vector of size (m+n−1).

8. The method of claim 7 wherein the vector includes (m+n−1) filter strengths, with each filter strength having a coefficient for one or more corresponding filter taps.

9. The method of claim 8 wherein a filter strength is selected based on a desired degree of smoothing or sharpening, and whether or not scan conversion is enabled.

* * * * *